United States Patent [19]

Ferenc et al.

[11] Patent Number: 4,588,118
[45] Date of Patent: May 13, 1986

[54] MOUNTING FOOT ASSEMBLY

[75] Inventors: Robert A. Ferenc, Middletown; Harold W. Lyons, Deep River, both of Conn.

[73] Assignee: Whelen Engineering Co., Inc., Chester, Conn.

[21] Appl. No.: 579,785

[22] Filed: Feb. 13, 1984

[51] Int. Cl.⁴ .............................................. B60R 9/00
[52] U.S. Cl. ..................................... 224/331; 224/329
[58] Field of Search ....................... 224/329, 330, 331; 24/457, 458; 248/231.2, 231.3, 231.4

[56] References Cited

U.S. PATENT DOCUMENTS 3,677,451  7/1972  Burland ................................ 224/330
3,897,895  8/1975  Read .................................... 224/329
4,192,424  3/1980  Allsop ............................... 248/231.3

FOREIGN PATENT DOCUMENTS 730994   3/1966  Canada .................................. 224/331
1138163  6/1957  France .................................. 224/331
1515857  3/1968  France .................................. 224/331

Primary Examiner—Stephen Marcus
Assistant Examiner—David Voorhees

[57] ABSTRACT

A mounting foot assembly for attaching a warning light to the exterior of a vehicle, the warning light including a pair of spaced inwardly facing slots in the base thereof, includes a pair of locking cams which are sized to be received in the slots. The mounting foot assembly also includes means for translating the rotational motion of an adjustment screw about a first axis to rotational motion of the locking cams in opposite directions about a pair of parallel axes whereby the locking cams will be caused to mechanically engage the bottoms of the slots.

9 Claims, 9 Drawing Figures

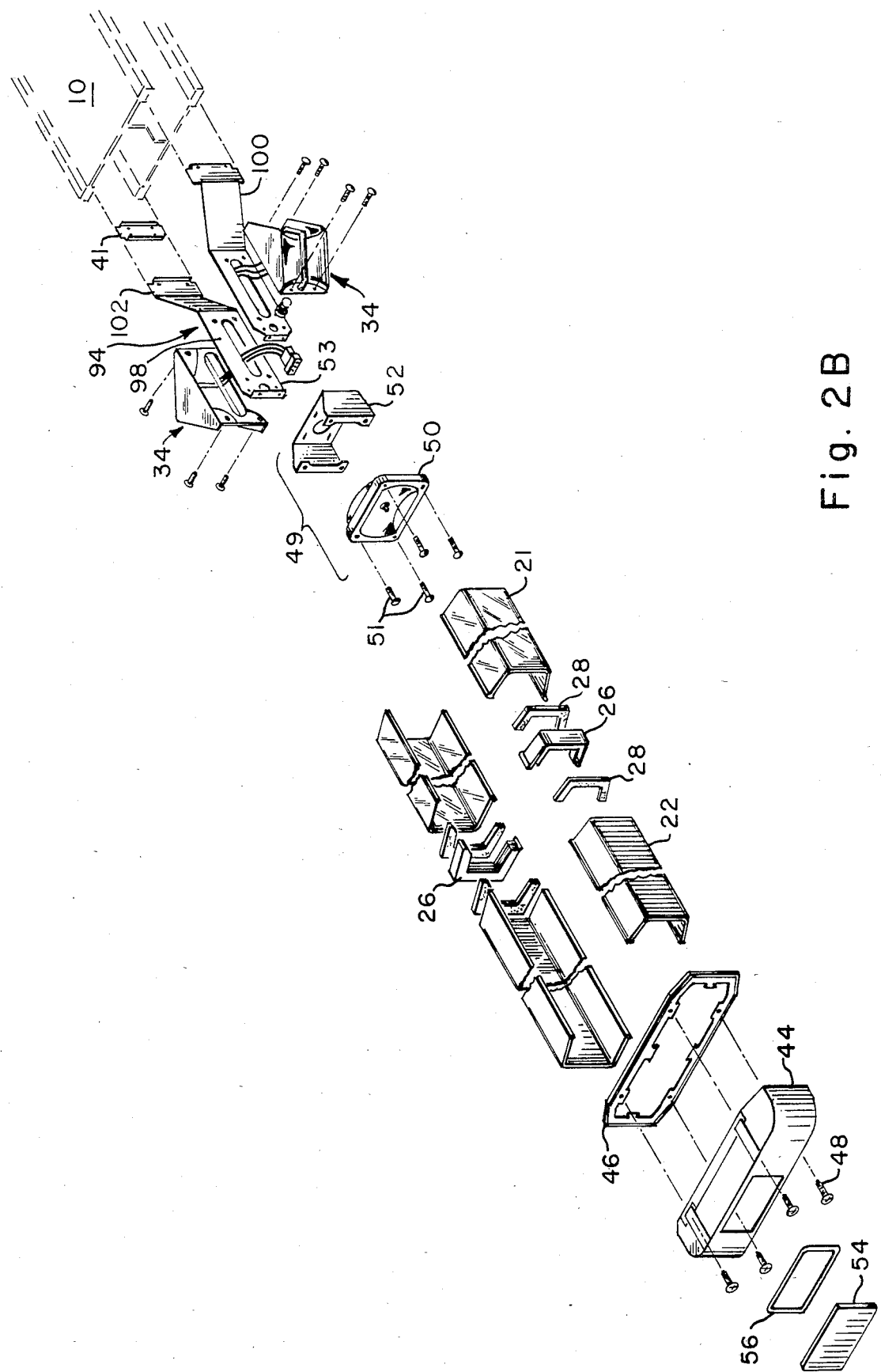

MOUNTING FOOT ASSEMBLY

BACKGROUND OF THE INVENTION

1. Field of the Invention

The present invention relates to a mounting foot for warning light systems and particularly for light assemblies for installation on vehicles, especially emergency and other public service vehicles. Accordingly, the general objects of the present invention are to provide novel and improved apparatus of such character.

2. Description of the Prior Art

Lighting systems for mounting on the exterior of police and other public service vehicles have long been known in the art. Exterior mounting of such lighting systems is generally preferred in order to enhance the visibility thereof, i.e., a warning light mounted above the roof of an emergency vehicle may be more readily seen than a light mounted below the vehicle roof line or within the vehicle and such exterior mounting affords the possibility of the emitted light being seen from any direction. Exterior mounting also minimizes the possibility that the light produced by the lighting system will interfer with the vision of the vehicle operator. Further, an exterior mounted lighting system may be designed to perform illumination functions which would otherwise have to be accomplished manually and thus an exterior mounted light assembly may free the vehicle operator's hands and attention for other tasks.

The most popular form of exterior lighting system for emergency vehicles is the lightbar which spans, but is spaced slightly above, the top of the vehicle and is supported by the vehicle top and clamped to the vehicle rain gutters. Lightbars are desirable because of their ability to provide a wide variety of types of illumination, because they can be installed easily and without major vehicle modifications, and because they can be removed from the vehicle if necessary or desirable. Previously available lightbar assemblies have, however, been characterized by a number of inherent deficiencies. A major deficiency of the prior lightbars has been their impact upon vehicle fuel consumption. Because of their comparatively large frontal area, prior lightbar assemblies had comparatively poor aerodynamic characteristics. Another deficiency of prior lightbar assemblies resided in their inflexibility of design. That is, the construction of prior lightbar assemblies did not permit the user to dictate the characteristics of the device but rather required the user to purchase from a limited number of "standard" models. Yet another disadvantage of previously available lightbar assemblies has been their generally decreased visibility in bright sunlight because of a "wash-out" effect resulting from light entering the assembly via the transparent or translucent upper side of the molded plastic housings thereof. Attempts to overcome this "wash-out" effect by applying an opaque coating to the interior of upper portions of the outer housings have not been entirely successful. Still another deficiency of prior lightbar assemblies was their comparatively heavy weight resulting from the type of construction which was required to prevent the assembly from sagging in the middle. Prior lightbar assemblies have often also been difficult to service. With regard to servicing, some prior art lightbar assemblies must be completely disassembled for servicing and any inoperative components painstakingly removed and repaired and the device then reassembled.

SUMMARY OF THE INVENTION

The present invention comprises a novel mounting assembly for an improved lighting system which is particularly well-suited for employment as a lightbar assembly for mounting on vehicles. The light system with which the present invention may be employed also encompasses improving the aerodynamic characteristics of lightbar assemblies by minimizing the profile, i.e., the frontal area, thereof. This lighting system additionally comprises a lightbar assembly design which permits modular construction, which inherently provides a sunshade to minimize wash-out effects, and which imparts adequate mechanical strength to prevent sag while at the same time minimizing weight.

A lightbar assembly with which the present invention may be employed is constructed around an I-beam structural member. The I-beam comprises a metal extrusion which is provided with locking grooves in both the leading and trailing edges of the upper and lower flange portions thereof. The lenses and other exposed components which are arranged at the leading and trailing sides of the assembly are provided with edge portions configured to be received in these locking grooves whereby, for example, lenses having different optical characteristics and colors may be mounted on the I-beam. The I-beam flanges are also provided with aligned upper and lower internal locating grooves which receive internal components such as support brackets for lights. Accordingly, there is a virtually unlimited number of possibilities of combinations of light sources and lenses which may be easily installed on and supported from the extruded I-beam.

The present invention, in a preferred embodiment, is a novel mounting foot for simultaneously engaging a vehicle rain gutter and a pair of oppositely facing mounting slots in the exterior of the lightbar I-beam. The mounting foot, which is adjustable and removable from the lightbar assembly and vehicle, serves to securely mount the assembly on the vehicle.

BRIEF DESCRIPTION OF THE DRAWING

The present invention may be better understood and its numerous objects and advantages will become apparent to those skilled in the art by reference to the accompanying drawing wherein like reference numerals refer to like elements in the several Figures and in which.

DESCRIPTION OF THE DISCLOSED EMBODIMENT

Figure 1:
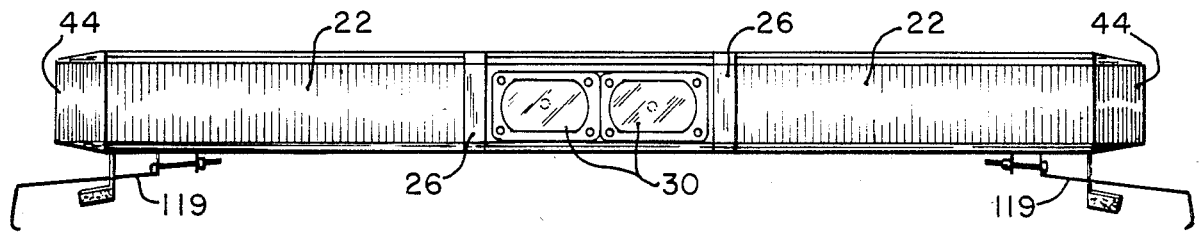
FIG. 1 is a front elevational view of a lightbar assembly with which the present invention may be employed.

With reference now to the drawing, and particularly jointly to FIGS. 1–4, the lightbar assembly includes, as the base portion thereof, an I-beam 10. Beam 10 includes a web 12 and upper and lower flanges 14. Beam 10 will preferably be an aluminum extrusion which, as may be seen from FIG. 3, has thickened flange edge portions in which are formed outwardly opening locking grooves 16. The outer surface of each of flanges 14 is provided, in the thickened edge portions which include the locking grooves 16, with longitudinally extending flat-bottomed channels 18. The flanges 14 of I-beam 10 are also provided, at the interior of the thickened edge portions thereof, with locating grooves 20. Groves 20 are positioned slightly inwardly with respect to the channels 18 and are aligned on the upper and lower flanges. The lower surface of I-beam 10 is additionally provided with a recessed flat surface 19 which extends between a pair of facing mounting slots 21. The grooves 16 and 20, channels 18 and slots 21 extend the length of I-beam 10. The top of I-beam 10 is flat between channels 18 and is parallel to surface 19. The flanges 14 of I-beam 10 cooperate to define therebetween a pair of oppositely opening channels which house, as shall be described in greater detail below, the light sources, reflectors and power supplies of the lightbar assembly.

The lightbar assembly is provided with generally C-shaped elements which may comprise lenses, and/or windows, and/or opaque covers and/or rear illuminated signs. As may best be seen from FIG. 4, which is a cross-sectional view of a C-shaped window element 21, these elements are provided, in the parallel oppositely disposed edge regions thereof, with portions 24 which are complementary in shape to the locking grooves 16 and the edge portions of the flanges 14 of I-beam 10 which ar disposed to either side of the entrances to grooves 16. The C-shaped elements are mounted on I-beam 10 by insertion from the ends thereof and sliding along the I-beam to the desired position. The shape of the cooperating locking grooves 16 and edge portions 24, and the tight fit therebetween, insures against leakage of moisture to the interior of the lightbar assembly between the C-shaped elements and the flanges 14. The C shaped elements will, in the case of lens elements such as indicated at 22 in FIGS. 1 and 2, be molded or extruded to impart the desired distribution pattern to light emitted from lamps or flash tubes positioned behind the C-shaped element within the lightbar assembly. The lens elements 22 depicted in FIGS. 1 and 2, for example, have a fluted inner surface defined by spreader optic bands which are separated by flats. These spreaders extend transversely with respect to the flat top and bottom surfaces of the flanges 14 of I-beam 10. The spreaders serve to direct light provided by a light source located behind the lens element within the lightbar assembly in a generally horizontal plane, i.e., a plane parallel to the exposed flat top surface of the I-beam.

Figure 2A:
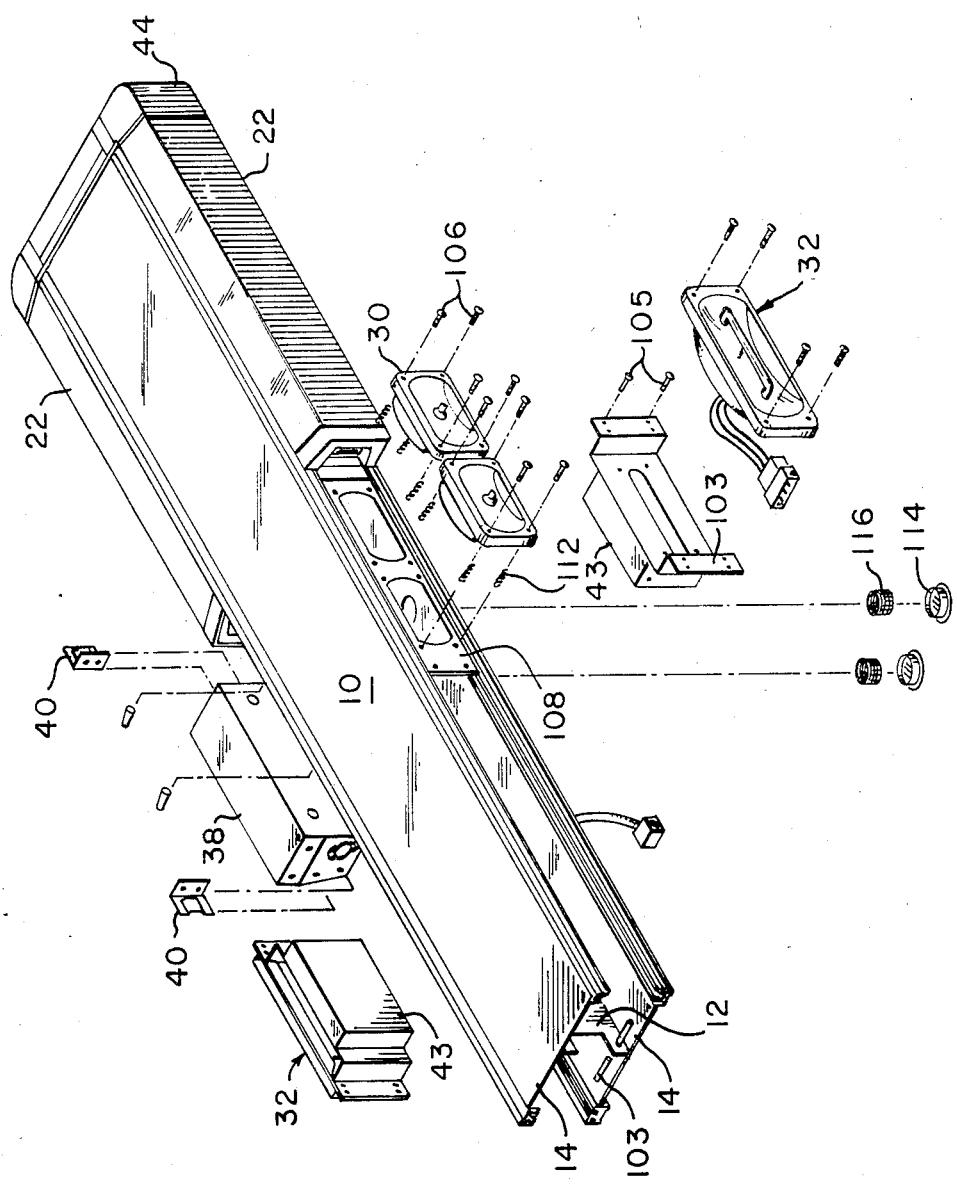
FIG. 2 is a partially exploded perspective view of the lightbar assembly of FIG. 1 with the mounting feet removed.

Continuing to refer to FIG. 2, a generally C-shaped divider 26 will be positioned between adjacent of the C-shaped elements such as between element 21 and lens element 22. The dividers will be provided with opposite edge portions which are identical in size and shape to the edge portions 24 of the C-shaped elements whereby the dividers may be inserted and captured in the locking grooves 16 in channels 14. Additionally, the dividers 26 are configured to have oppositely facing grooves in the sides thereof, these side grooves being commensurate in shape with the cross-sectional area of the C-shaped elements. A gasket 28 will be seated in each of the side grooves in each divider 26. When the lightbar is assembled the gaskets 28 will be in contact with, and compressed by, respective facing edges of a pair of adjacent C-shaped elements and these adjacent edges will be overlapped by forwardly and rearwardly facing portions of a divider 26. Accordingly, because of the overlapping and the gasketing, a substantially liquid tight seal is provided between adjacent C-shaped elements. The dividers 26 and gaskets 28 function as expansion joints which also compensate for different coefficients of expansion of the I-beam 10 and the plastic C-shaped elements. The gaskets 28 are preferably comprised of a closed cell material, for example a closed cell sponge rubber.

The lightbar assembly being described, because of its modular construction, may be assembled in accordance with the users need or preference of light type and position and lens color and optical characteristics. In the disclosed embodiment the lightbar is provided, at its mid-section, with a pair of "take-down" lights 30 which will typically be halogen lamps and associated molded, metallized plastic reflectors. Lights 30 will function as spot lights and the light provided thereby will be sufficiently intense to make it extremely difficult for a person in the illumination field to determine the precise position of an individual standing rearwardly of the lightbar in the dark. The lightbar assembly of the disclosed embodiment also includes, spaced outboardly with respect to lights 30 and at the opposite sides of web 12, pairs of miniaturized high intensity strobe lights 32. The strobe lights 32 may be of similar construction to the light disclosed in co-pending application Ser. No. 487,033, assigned to the assignee of the present invention. In a typical application there will be a pair of strobe lights housed in both the forwardly and rearwardly facing channels of beam 10 but the spacing between the rearwardly and forwardly facing lights may be different. The color of the lens element in front of each of the strobe lights may differ from side-to-side and/or from front-to-back, i.e., the lens elements on the drivers side of the vehicle may for example be red while the lens elements on the passenger side of the vehicle may for example be blue and these colors may be reversed front to back. A clear, i.e., transparent, C-shaped element, i.e., an element without optic spreader bands, will typically be provided to extend over the frontal area of the lightbar which houses the take-down lights 30. Such a transparent element is indicated at 21 and, as noted above, shown in cross-section in FIG. 4. Further, in the disclosed embodiment, a unique strobe light having a 180° radiation pattern will be placed adjacent each of the four corners of I-beam 10, a pair of these 180° lights being indicated generally at 34. The power supply or power supplies for the strobe lights will also be mounted in the I-beam. A power supply for lights 34 has been indicated at 38 and will be provided with side brackets, as indicted at 40, which are bolted to slide members 41 which engage the upper and lower locating grooves 20 in the I-beam flanges. Motion of the power supply 38 along the channel in which it is housed is prevented by alignment pins which extend from I-beam web 12 and engage and support the power supply. An opaque C-shaped element, as indicated at 42, will typically be provided to cover the power supply or power supplies. Each of strobe lights 32 will typically have its own power supply, such power supplies being indicated at 43. The power supplies 43 are located in the I-beam channel directly behind their respective lights and are supported on brackets as will be described in greater detail below.

Each end of the lightbar assembly is provided with a molded plastic end cap 44 which, when installed, will abut the ends of the most outwardly located lens elements 22. The end caps 44 also abut the ends of the I-beam 10. A gasket 46 is provided within each end cap for the purpose of establishing a seal between the end cap and the I-beam and also between the end cap and the abutting lens elements 22. The end caps are mounted on the I-beam by means of four thread forming screws 48 which engage the locating grooves 20 in I-beam 10. One of end caps 44 is also shown, on an enlarged scale, in FIG. 8.

As may be seen from FIG. 2, the web 12 of the I-beam may be notched at the ends so as to provide room for connection to the cable which supplies power for further light sources which are mounted at the ends of the lightbar assembly within the end caps 44. In the disclosed embodiment these further light sources comprise halogen spot lights, indicated generally at 49, which include reflectors 50 and an associated mounting bracket 52. The socket for the halogen lamp of lights 49 will be permanently secured within the reflector 50. Reflector 50 is mounted, by means of screws 51, in bracket 52. Bracket 52 is provided, on its rear side, with slots which receive elongated tabs or flanges 53 of the mounting brackets 94 of the 180° strobe lights 34. As will become apparent from the discussion below, the brackets for each of the various light sources of the lightbar assembly will be mechanically connected to adjacent brackets and these interconnected brackets are affixed to web 12 of I-beam 10 at least at one point. The lights 49, in the disclosed embodiment, function as "alley" lights and thus desirably provide a high intensity beam. Accordingly, if the end caps 44 are, as is the usual case, formed of a colored plastic they are provided with clear "windows" 54. The windows are held in position by means of flexible locking projections which engage the interior of the end cap. Windows 54 may be either "flat" or may include optic spreader bands. An adhesive may also be employed to secure the inserts 54 in position. Gaskets 56 ar provided to insure leakage between the inserts 54 and end cap 44, the gaskets being received in recesses provided in the inwardly facing side of each insert.

In the typical application the "alley" lights at each end of the lightbar may be selectively and separately energized from the vehicle main electrical power supply and the "take-down" lights will be similarly independently operated as a pair. The requisite wiring for all of the spot-type and strobe lights will be routed through the I-beam defined channels.

Figure 7:
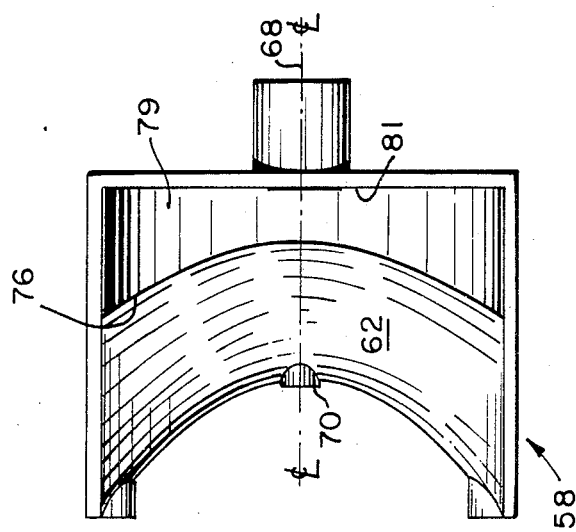
FIG. 7 is a side-elevation view of the reflector portion of the light of FIGS. 5 and 6.
Figure 5:
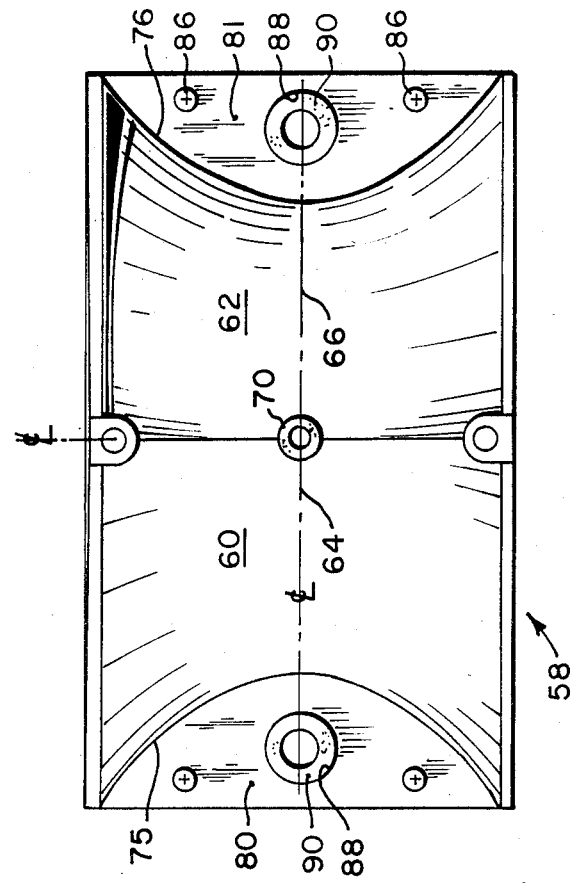
FIG. 5 is a front elevation view of a light in accordance with the present invention which provides an 180° illumination pattern.
Figure 6:
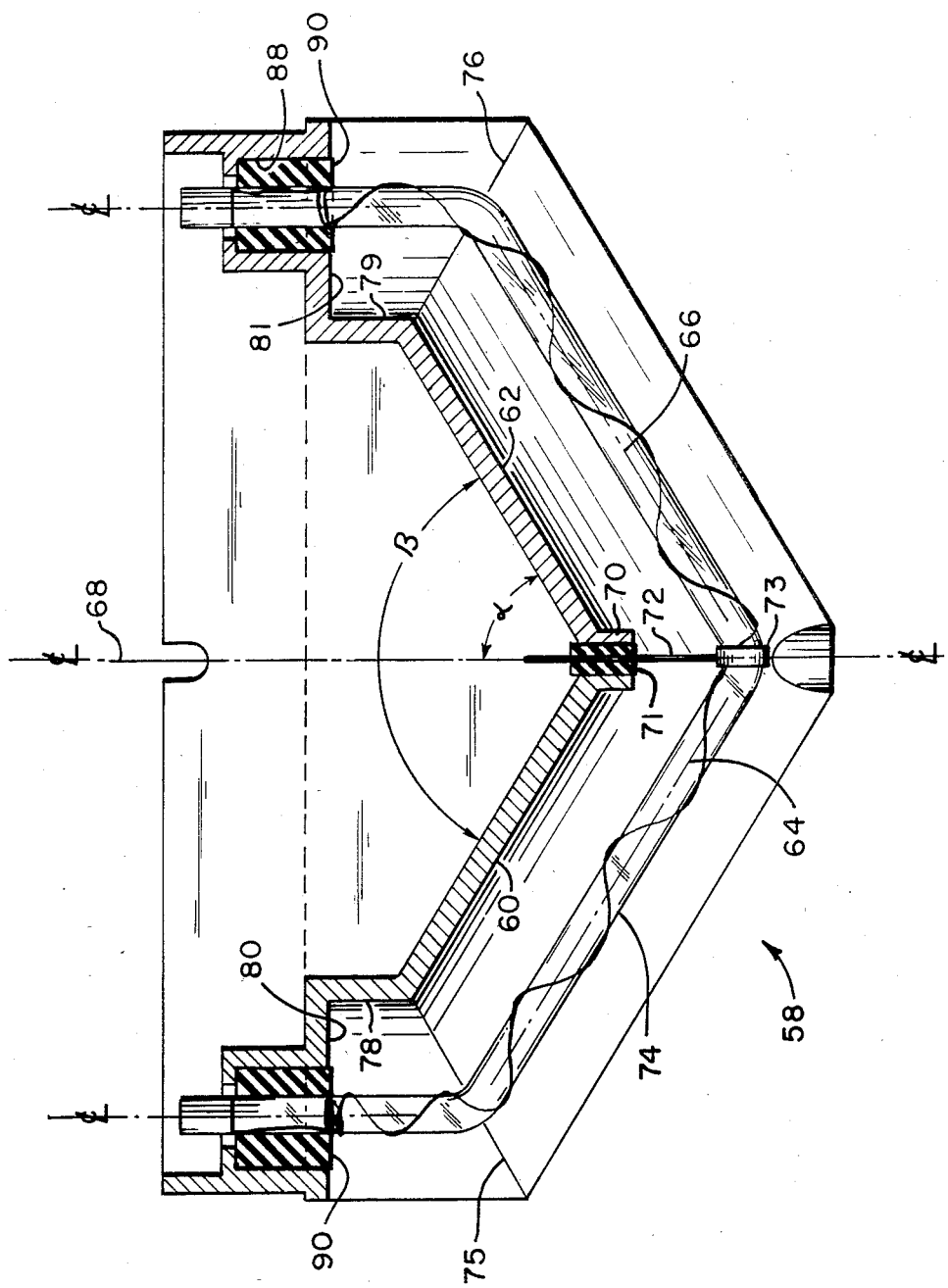
FIG. 6 is a cross-sectional, top-elevation view of the light of FIG. 5.

The 180° lights 34 each comprise a unique reflector 58 which may be seen in perspective in FIG. 2 and which is further shown in FIGS. 5-7. The reflectors 58 include a pair of parabolic surfaces 60 and 62 respectively having linear focal points 64 and 66. The vertices of the parabolic reflector surfaces and the focal point lines 64 and 66 which are parallel thereto define a first plane. The vertices of the two parabolic surfaces 60 and 62 intersect at an angle $\beta$ of 120°, i.e., the vertex of each of parabolic reflecting surfaces 60 and 62 intersects the center line 68 of the reflector assembly at an angle $\alpha$ of 60°. A mounting hole, surrounded by a cylindrical projection 70, is provided on the center line of the reflector 58. An insulating grommet 71 is inserted in this mounting hole. A metallic flash tube support 72 extends through grommet 71 and includes a ring 73 through which the flash tube 74 passes. The ring 73 is electrically connected to the trigger winding of flash tube 74. As may be seen from FIG. 7, the intersection of the parabolic surfaces 60 and 62 is a parabolic arc through which the center line 68 extends. The opposite ends of reflective surfaces 60 and 62 are cut-off along parabolic arcs 75 and 76 and the resulting reflective side surfaces 78 and 79 extend back to flat reflecting surfaces 80 and 81. Surfaces 80 and 81 lie in a plane which is transverse to both the above-mentioned first plane, defined by the vertices of the parabolic surfaces 64 and 66 and the parallel lines which include their focal points, and to a second plane perpendicular to the first plane in which the center line 68 lies. The surfaces 78 and 79, which respectively extend between the cut-off arcs 75 and 76 and the flat surfaces 80 and 81 will, at all points, be transverse to respective reflective surfaces 80 and 81 as may be seen from FIG. 6. Reflector 58 will be molded from plastic and will be metallized. The surfaces 80 and 81 are provided with holes 86 for mounting screws and further holes 88. The holes 88 have their axes lying in the aforementioned first plane. Insulating grommets 90 are inserted in the holes 88.

The anode and cathode of a gas discharge tube 92, typically a flash tube filled with an ionizable gas which will usually include zenon gas, will be supported in respective of grommets 90. Tube 92 will also be supported at its mid-point by ring 73 of support 72. The flash tube 92 is formed such that it will be bent, at its mid-point, whereupon it defines a pair of longitudinal axes which intersect at 120°. The flash tube will be supported so that its axes will, to the extent permitted by manufacturing tolerances, be coincident with the focal points of reflective surfaces 60, 62, 78 and 79. The flash tube 92 will customarily be adhesively secured in place to insure that it remains in the aforementioned position which maximizes efficiency, i.e., the maximum possible light intensity will be radiated and the radiated light will be spread over an angle of 180°.

The reflector 58 is affixed to the aforementioned mounting bracket 94 by means of mounting screws 96. Bracket 94 has an apertured flat portion 98, to which the reflector 58 is attached, an angled portion 100 which extends outwardly from flat portion 98 toward the open end of the channel in which the reflector is positioned, and a further flat portion 102 which is parallel to portion 98. Flat portion 102 of bracket 94 is of extended width. The above-mentioned tabs 53 extend from the end of flat portion 98 which is opposite to portion 100. The angled portion 100 may be provided with the appropriate surface finish so that it can function as a mirror to enhance the efficiency of the 180° lights. The portions of extended width, i.e., the oppositely disposed tabs at the ends of portion 102 of bracket 94, are received in the locating grooves 20 in the top and bottom of the flanges 14 of I-beam 10. Portion 102 of the brackets 94 of the forwardly facing lights are bolted to a bracket 103 to which one of the power supplies 43 for a strobe 32 is also affixed. If the lightbar assembly does not include rearwardly facing strobe lights 32, the portions 102 of the rearwardly disposed 180° lights will be affixed to brackets which are located in grooves 20 and extend to the brackets 40 of power supply 38. The portions 98 of brackets 94 are provided with apertures which are engaged by stand-offs 103 which pass through web 12 of I-beam 10. The stand-offs 103 thus locate brackets 94, and, in so doing, locate the other interconnected brackets in the channels of I-beam 10. The length and angle of portion 100 of bracket 94 is selected so as to locate the reflector 58 in the desired position. This position is typically with the outermost portion of the reflector located adjacent the plane of the edge of the I-beam 10. The height of reflector 58 is such that it will fit between the facing flat surfaces of the thickened outer edge portions of the flanges 14 of I-beam 10 which define the locking grooves 16 and 20.

Continuing with a discussion of the relationship between the reflectors of all of the light sources of the lightbar assembly of FIG. 2, it is to be noted that the light sources, i.e., the lamps or flash tubes and their associated reflectors, are in most assemblies positioned entirely inwardly with respect to the edges of I-beam 10. Accordingly, the I-beam, in addition to defining a housing which receives the various components of the lightbar assembly and is of sufficient strength to prevent any sag, also functions as a sun shade.

It is also to be observed that, in the disclosed embodiment, the take-down lights 30 may be individually aimed. For this purpose the lights are mounted, by means of mounting screws 106, from an apertured support plate 108 which is received in the locating grooves 20. Plate 108 is threaded to receive screws 105 which pass through bracket 103. Springs 112 are positioned about screws 106 to spring bias locating surfaces on the inwardly facing sides of the reflectors of the lights 30 away from bracket 108. By varying the spring tension, through tightening or loosening screws 106, lights 30 may be aimed, within limits, upwardly, downwardly, to the right or to the left.

As may be seen from FIG. 2, the reflectors of lights 30 extend rearwardly through the apertures in plate 108 and the clearance between the reflectors and plate is sufficient to permit aiming.

Figure 3:
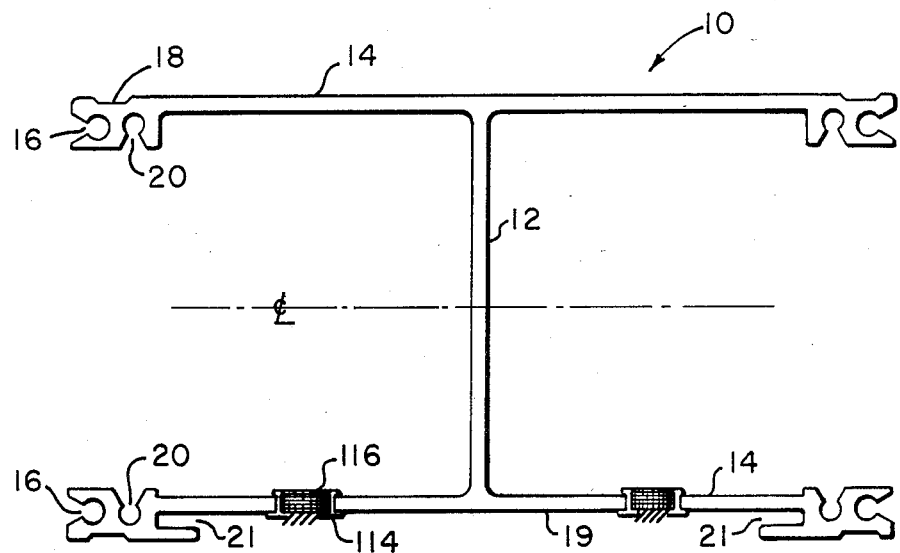
FIG. 3 is a cross-sectional, side-elevation view of the I-beam mounting base of the lightbar assembly of FIG. 1.
Figure 4:
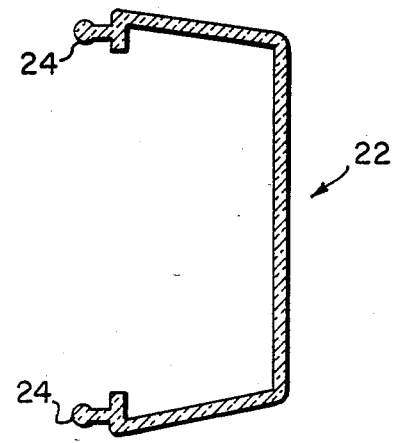
FIG. 4 is a cross-sectional, side-elevation view of one of the lens sections of the lightbar assembly of FIG. 1.

Since the lightbar assembly will likely be subjected to harsh operating condition, particularly variations in temperature and humidity, condensate may form in the I-beam defined channels. In order to eliminate any moisture which may form inside the lightbar assembly, the lower flanges 14 of the I-beam 10, in the recessed portion 19 thereof, will be provided with at least a pair of drain holes. Referring to FIGS. 2 and 3, caps 114 are received in these drain holes. The caps 114 are provided with a plurality of resilient ears and some of these ears will engage the inner surface of the I-beam flanges to hold the caps in position. The caps are also provided with slots which extend therethrough and, as may best be seen from FIG. 3, with outwardly extending angled vanes, the vanes being formed from the material which is punched out to form the slots. The caps will be rotated so that the vanes extend toward the rear of the vehicle. Accordingly, during vehicle motion, air passing over the vanes will create a low pressure region whereby moisture will be drawn from within the assembly. The caps 114 will receive plugs 116 which are formed from an open-cell foam material. The plugs 116 act as sponges to absorb moisture and also serve as air filters to prevent intrusion of dst into the assembly. The foam plugs 116 are held in position in the caps 114 by bending at least some of the ears formed on the caps inwardly over the plugs.

A long-standing problem with prior lightbar assemblies resides in the mounting the assembly to the vehicle in such a manner that it may be removed, may be easily positioned as desired on the vehicle and, most importantly, will not become loose due to vibration or other causes and either change position or become dislodged. There are, of course, many mounting foot assemblies known in the prior art for attaching devices to the rain gutter of a motor vehicle. These prior art mounting foot devices, however, have not adequately solved the problems alluded to above and could not be modified so as to be used in mounting the low profile lightbar assembly of the present invention. A novel mounting foot in accordance with the present invention is depicted, in an exploded perspective view, generally at 119 in FIG. 8. This mounting foot assembly includes a mounting member 120, a gutter clamp 122, a locking member 124, a pair of locking cams 126, an adjustment screw 128 and a pair of locking screws 130. The mounting member 120 is provided with a pair of upwardly extending tabs 132 which are received in slots provided in the locking cams 126. The locking cams, in turn, are provided with upwardly extending tabs 134 which are received in round holes provided in the locking member 124. The adjustment screw 128 passes through an aperture provided therefor in an upwardly extending flange at the inwardly disposed end of the gutter clamp 122. The locking member 124 has a downwardly extending flange 136. The flange 136 is provided with means which engages the adjustment screw 128. In the disclosed embodiment this engagement means comprises a nut 138 which is held in position in a square opening in flange 136 by any suitable means.

Figure 8:
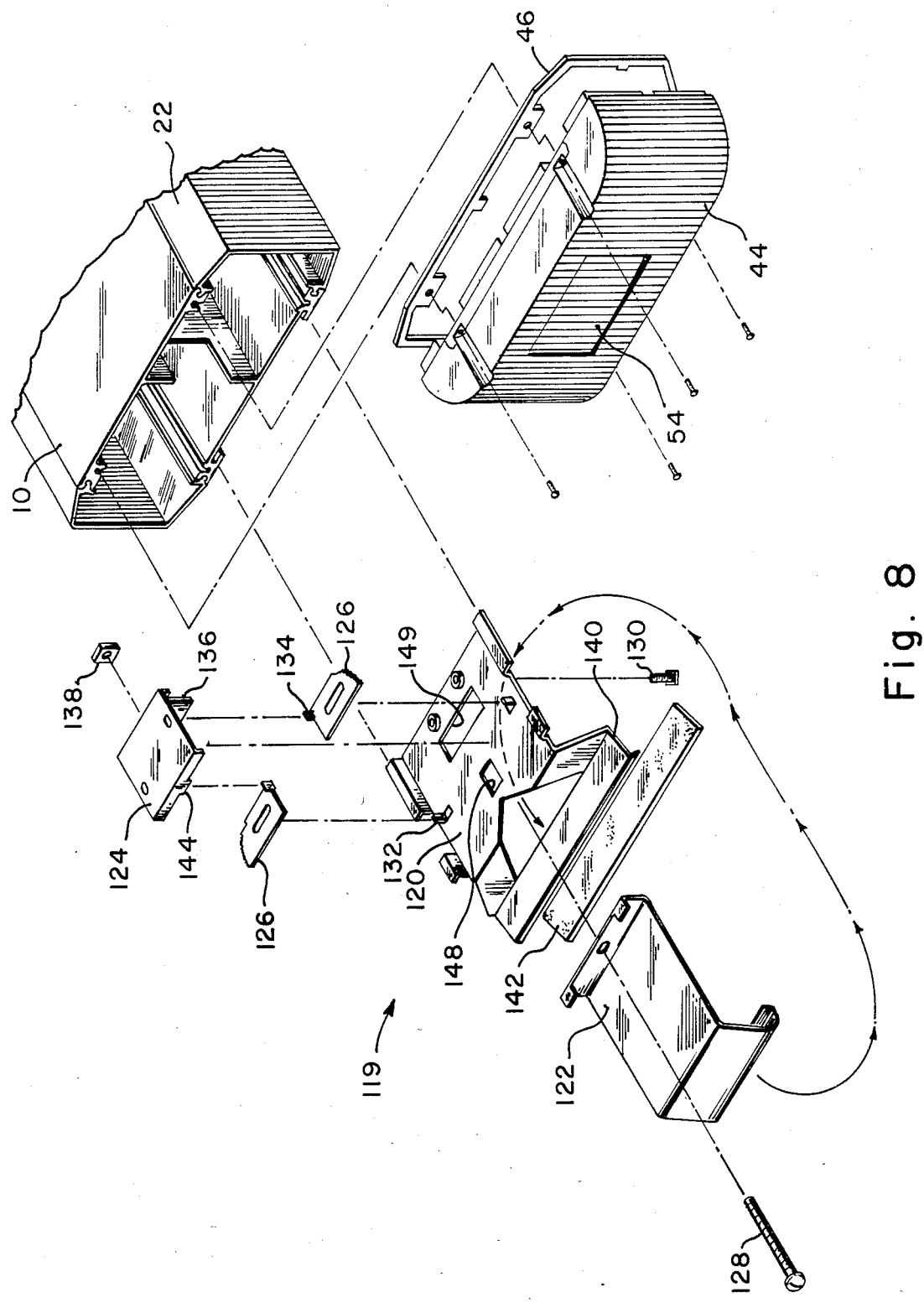
FIG. 8 is an exploded perspective view which shows a mounting foot in accordance with the present invention and designed specifically for use with the lightbar of FIG. 1.

In use of the mounting foot 119 of FIG. 8, which incidentally is shown schematically only in FIG. 1, the gutter clamp 122 will be caused to engage the outside of the vehicle rain gutter at the desired location for the lightbar assembly. Stability for the mounting foot will be provided by the mounting member 120 which has a lower foot portion 140 which engages the vehicle roof, via a rubber mounting pad 142, inwardly with respect to the gutter. The locking cams 126 extend outwardly from the edges of foot member 120 and will engage the mounting slots 21 in the bottom of the I-beam 10. With the gutter clamp and foot 140 of mounting member 120 in the desired position, rotation of screw 128 will cause locking member 124 to move longitudinally with respect to the I-beam, such motion being guided by engagement of a tang 144 on the locking member 124 and the flange 136 respectively with openings 148 and 149 in member 120. During such motion the locking member 124 will slide on the surface of mounting member 120. Clockwise rotation of screw 120 will cause locking member 124 to move outwardly i.e., toward the gutter clamp and, at the same time, the locking cams 126 will be cammed outwardly as a result of rotation in opposite directions about tabs 132 whereby the serrated edge portions thereof will be forced into the relatively soft aluminum which defines the bottoms of the slots 21 in the extruded I-beam 10. Accordingly, the mounting foot will be securely locked to the I-beam whereby the lightbar assembly will be unable to move relative to the two mounting foot assemblies at the opposite ends thereof. The locking action, since there is a longitudinal component of motion thereto, will also urge the gutter clamp 122 inwardly thereby securely locking the mounting feet to the gutters at the opposite sides of the vehicle. The locking screws 130 pass through threaded bosses and contact the bottom of the I-beam. Screws 130 will be tightened against the I-beam after the above-described installation procedure is completed and will function as safety locks which insure that there will be no relative movement between the I-beam and mounting foot should the locking cams 126 become loose.

While a preferred embodiment of a mounting foot assembly components thereof in accordance with the present invention has been shown and described, various modifications and substitutions may be made thereto without departing from the spirit and scope of the invention. Accordingly, it is to be understood that the present invention has been described by way of illustration and not limitation.

What is claimed is:

1. A removable mounting foot assembly for supporting an elongated member, the elongated member being comprised of a first material and having a pair of spaced parallel channels therein, said channels being generally U-shaped so as to be open at one side and having bottoms disposed opposite to the open sides, the open sides being in facing relationship, said mounting foot assembly comprising:

base means for supporting a said enlongated member from a surface, said base means including a support foot, said base means being designed to fit between said facing open sides of the channels of the member to be supported;

a pair of cam means for releasably engaging the enlongated member, said cam means each being essentially flat and enlongated and having an irregularly shaped edge portion, said cam means being comprised of a material which is harder than said first material, said cam means edge portions being sized to be received in the channels of the elongated member;

means for mounting said cam means on said base means, said mounting means defining a pair of parallel axes and permitting only rotational motion of said cam means about respective of said axes; and adjustable locking means, said locking means engaging said cam means and said base means, said locking means retaining said cam means on said base means and being linearly movable relative to said base means, linear movement of said locking means imparting rotational motion in opposite directions about said axes to said cam means whereby said cam means may be simultaneously rotated to cause said irregular edge portions thereof to extend outwardly from said base means and enter said channels throught the open sides thereof and engage the first material at the bottom of the said channels to thereby secure said base means to the elongated member at any desired location along the length thereof.

2. The mounting foot assembly of claim 1 further comprising:

clamp means for securing said base means to a motor vehicle, said clamp means having oppositely disposed first and second ends, said first end of said clamp means engaging said base means, said clamp means extending outwardly from said base means to said clamp means second end, said clamp means second end being configured to engage a portion of a motor vehicle exterior surface.

3. The mounting foot assembly of claim 2 wherein said clamp means is also engaged by said locking means.

4. The mounting foot assembly of claim 3 wherein said base means further includes a pair of oppositely extending flanges, said flanges being sized to be received in said channels whereby said said base means may be supported from the elongated member by means of said flanges prior to operation of said locking means to establish contact between said cam means and the bottoms of said channels.

5. The mounting foot assembly of claim 4 wherein said cam means mounting means comprises a pair of posts extending outwardly from said base means, said cam means each being provided with an aperture which receives one of said posts.

6. The mounting foot assembly of claim 5 wherein said locking means comprises:

a locking member;

means for defining a linear motion path for said locking member;

means for imparting motion to said locking member; and means for coupling said locking member to said cam means.

7. The mounting foot assembly of claim 6 wherein said coupling means comprises:

an arm extending outwardly from each of said cam means; and a pair of circular holes in said locking member, said arms being received and rotatable in respective of said circular holes.

8. The mounting foot assembly of claim 7 wherein said means for guiding the motion of said locking member comprises:

a pair of openings in said base means, said openings each having at least one straight edge; and a pair of flanges extending outwardly from said locking member, said flanges having side edges which are complementary in shape to the sides of said openings whereby cooperation between said flanges and openings determines the direction of motion of said locking member.

9. The mounting foot assembly of claim 8 wherein said means for imparting motion to said locking member comprises:

an adjustment screw, said adjustment screw extending through said clamp means and driving means engaging one of said mounting member flanges whereby rotational motion of said adjustment screw will be translated to linear motion of said locking member.

* * * * *